US012788070B2

(12) United States Patent
Lee

(10) Patent No.: US 12,788,070 B2
(45) Date of Patent: Nov. 10, 2026

(54) AEROSOL GENERATING DEVICE FOR CONTROLLING POWER SUPPLY TO HEATER AND OPERATING METHOD THEREOF

(71) Applicant: KT&G CORPORATION, Daejeon (KR)

(72) Inventor: Jae Min Lee, Siheung-si (KR)

(73) Assignee: KT&G CORPORATION, Daejeon (KR)

( * ) Notice: Subject to any disclaimer, the term of this patent is extended or adjusted under 35 U.S.C. 154(b) by 869 days.

(21) Appl. No.: 17/912,991

(22) PCT Filed: Aug. 8, 2022

(86) PCT No.: PCT/KR2022/011788
§ 371 (c)(1),
(2) Date: Sep. 20, 2022

(87) PCT Pub. No.: WO2023/033390
PCT Pub. Date: Mar. 9, 2023

(65) Prior Publication Data

US 2024/0215652 A1 Jul. 4, 2024

(30) Foreign Application Priority Data

Sep. 2, 2021 (KR) ........................ 10-2021-0117109

(51) Int. Cl.
*A24F 40/57* (2020.01)
*A24F 40/51* (2020.01)
(Continued)

(52) U.S. Cl.
CPC .............. *A24F 40/57* (2020.01); *A24F 40/51* (2020.01); *A24F 40/53* (2020.01); *G01N 27/223* (2013.01)

(58) Field of Classification Search
None
See application file for complete search history.

(56) References Cited

U.S. PATENT DOCUMENTS 10,912,336 B2 2/2021 Reevell
2017/0033836 A1 2/2017 Bernauer et al.
(Continued)

FOREIGN PATENT DOCUMENTS

CA 3 096 955 A1 9/2019
CN 112469294 A 3/2021
(Continued)

OTHER PUBLICATIONS

Korean Office Action dated Mar. 5, 2024 in Application No. 10-2021-0117109.
(Continued)

*Primary Examiner* — Michael H. Wilson
*Assistant Examiner* — Tobey C Le
(74) *Attorney, Agent, or Firm* — Sughrue Mion, PLLC

(57) ABSTRACT

An aerosol generating device may include a heater configured to heat an aerosol generating article, a sensor configured to output a signal indicating a change in capacitance which occurs by insertion of the aerosol generating article, and a processor electrically connected to the heater and configured to set a preheating temperature profile for the heater on the basis of the signal output from the sensor, and supply power to the heater according to the set preheating temperature profile.

15 Claims, 7 Drawing Sheets

(51) Int. Cl.
*A24F 40/53* (2020.01)
*G01N 27/22* (2006.01)

(56) References Cited

U.S. PATENT DOCUMENTS

| | | | | |
|---|---|---|---|---|
| 2017/0265523 | A1* | 9/2017 | Lipowicz | H05B 3/26 |
| 2019/0261683 | A1 | 8/2019 | Reevell | |
| 2020/0093185 | A1* | 3/2020 | Lim | A24F 47/008 131/330 |
| 2020/0237005 | A1 | 7/2020 | Lim et al. | |
| 2020/0352244 | A1* | 11/2020 | Lim | A24F 40/60 |
| 2021/0022402 | A1 | 1/2021 | Bless et al. | |
| 2021/0052835 | A1 | 2/2021 | Lee | |
| 2021/0127748 | A1 | 5/2021 | Lim et al. | |
| 2021/0145068 | A1* | 5/2021 | Bessant | A24F 40/95 |
| 2021/0251295 | A1 | 8/2021 | Mironov et al. | |
| 2021/0267280 | A1 | 9/2021 | Zigmund | |
| 2022/0125110 | A1* | 4/2022 | Frake | A24D 1/20 |
| 2023/0013486 | A1 | 1/2023 | Kim et al. | |
| 2023/0086478 | A1* | 3/2023 | Li | A24F 40/40 131/329 |
| 2023/0397304 | A1 | 12/2023 | Abi Aoun et al. | |
| 2024/0251874 | A1 | 8/2024 | Kim et al. | |

FOREIGN PATENT DOCUMENTS

| | | | | |
|---|---|---|---|---|
| CN | 117545385 | A | 2/2024 | |
| JP | 11-346747 | A | 12/1999 | |
| JP | 2020-527944 | A | 9/2020 | |
| JP | 2021-507715 | A | 2/2021 | |
| KR | 10-2018-0058709 | A | 6/2018 | |
| KR | 10-2019-0130022 | A | 11/2019 | |
| KR | 10-2020-0026922 | A | 3/2020 | |
| KR | 10-2021-0029152 | A | 3/2021 | |
| KR | 10-2021-0105256 | A | 8/2021 | |
| WO | WO-2019005526 | A1 * | 1/2019 | A61M 15/06 |
| WO | 2020/165450 | A1 | 8/2020 | |
| WO | 2021/141290 | A1 | 7/2021 | |
| WO | WO-2021139804 | A1 * | 7/2021 | H02M 3/156 |
| WO | 2021/157841 | A1 | 8/2021 | |

OTHER PUBLICATIONS

Communication dated Aug. 5, 2024, issued in Korean Application No. 10-2024-0092021.

Office Action issued Jan. 2, 2024 in Korean Application No. 10-2021-0117109.

Extended European Search Report issued Nov. 9, 2023 in European Application No. 22768249.9.

International Search Report dated Nov. 18, 2022 issued by the International Searching Authority in Application No. PCT/KR2022/011788.

Written Opinion dated Nov. 18, 2022 issued by the International Searching Authority in Application No. PCT/KR2022/011788.

Chinese Office Action dated Jan. 23, 2026, issued in Chinese application No. 202280006224.6.

* cited by examiner

[Fig. 1]
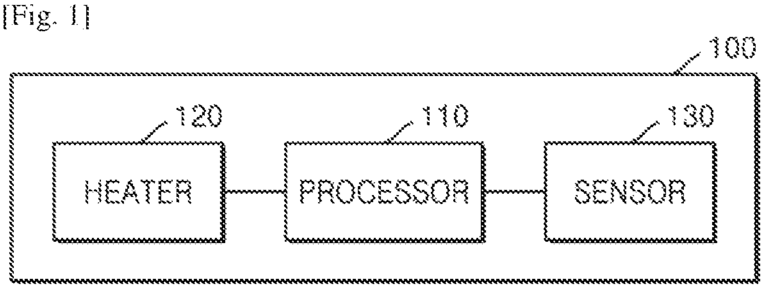
[Fig. 2]
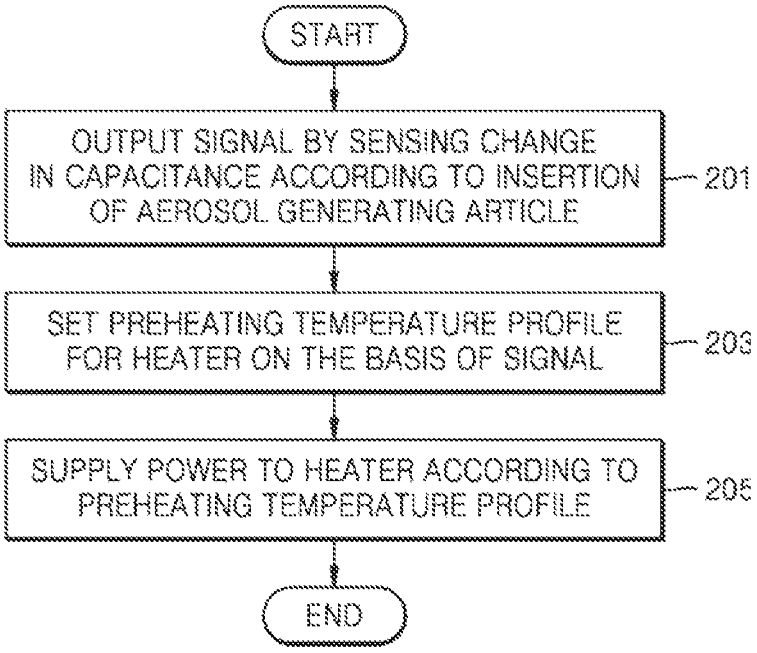

[Fig. 3]
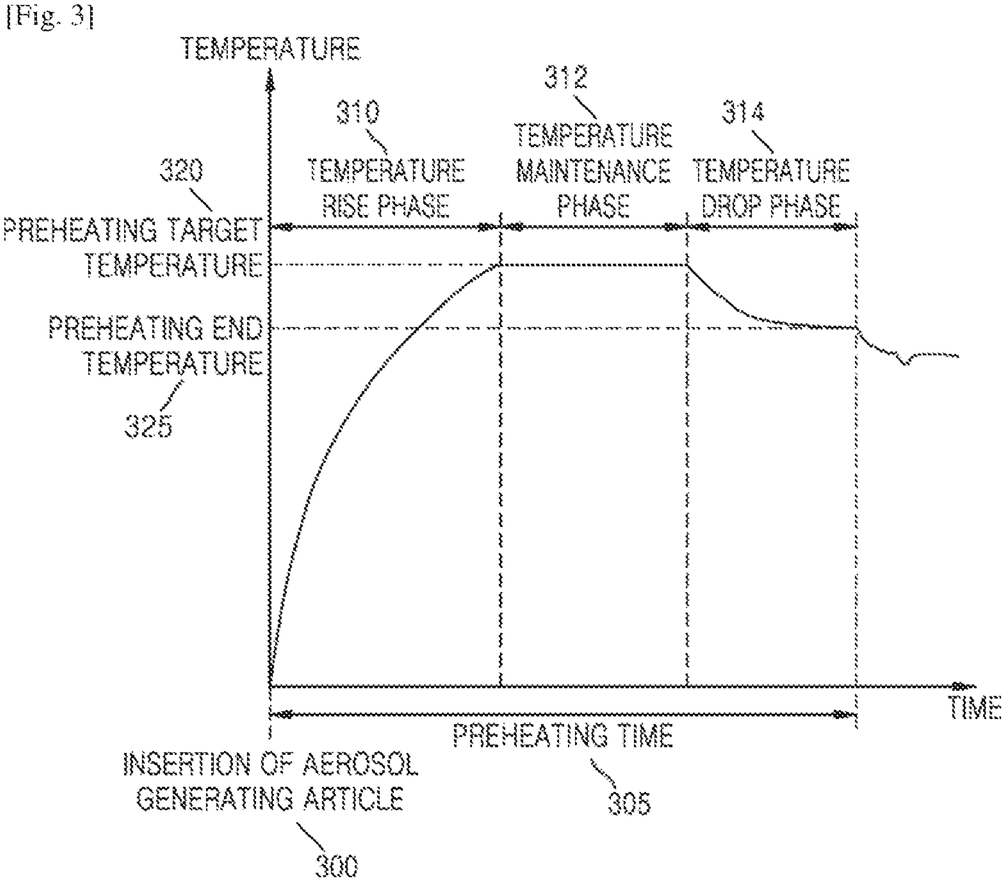
[Fig. 4]
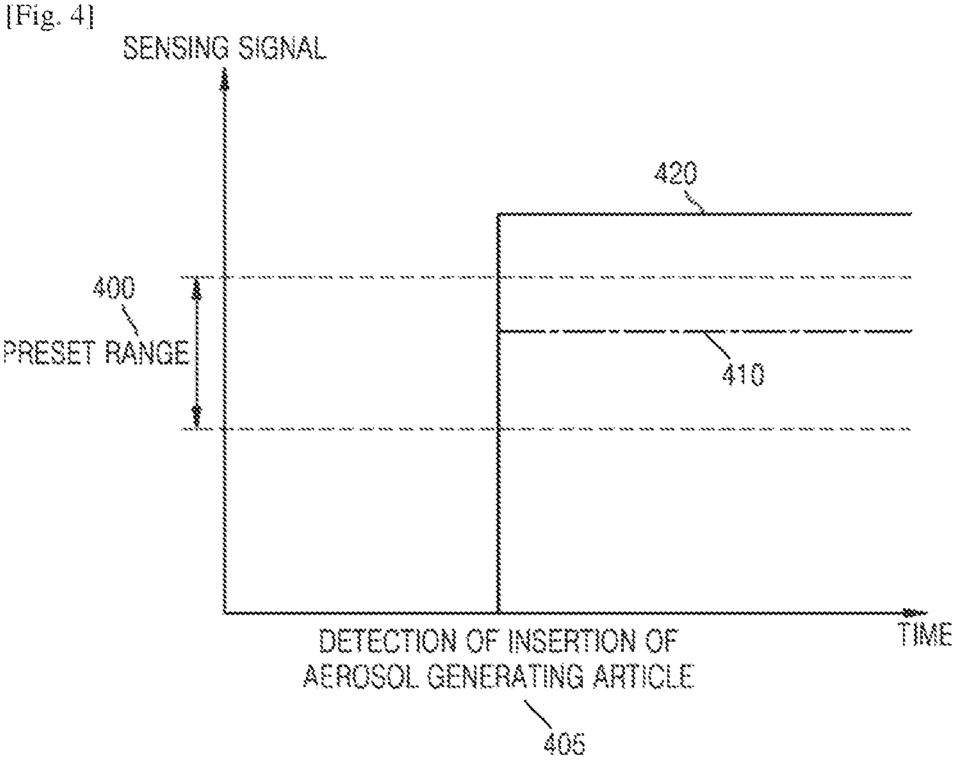

[Fig. 5A]
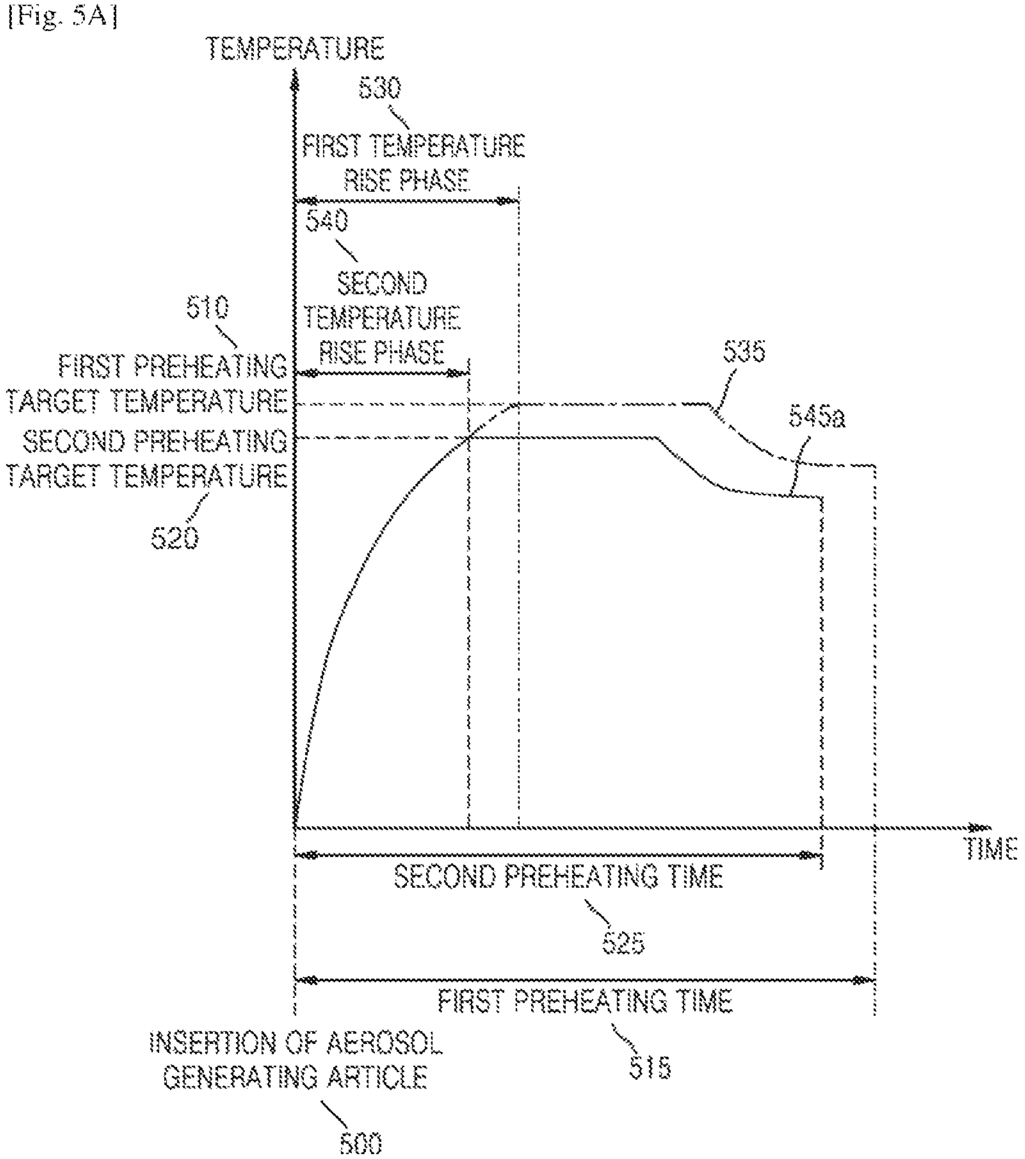

[Fig. 5B]
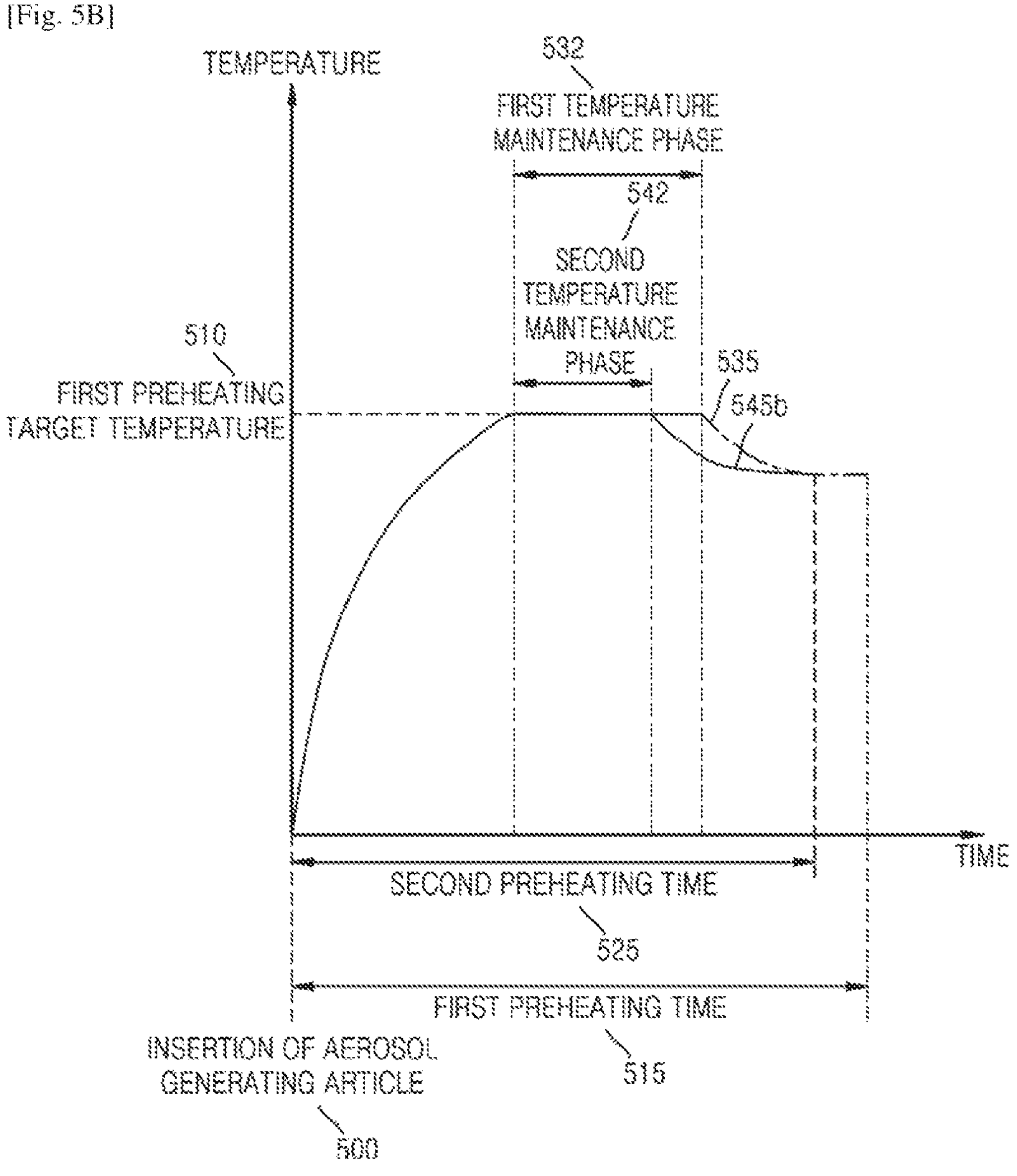

[Fig. 5C]
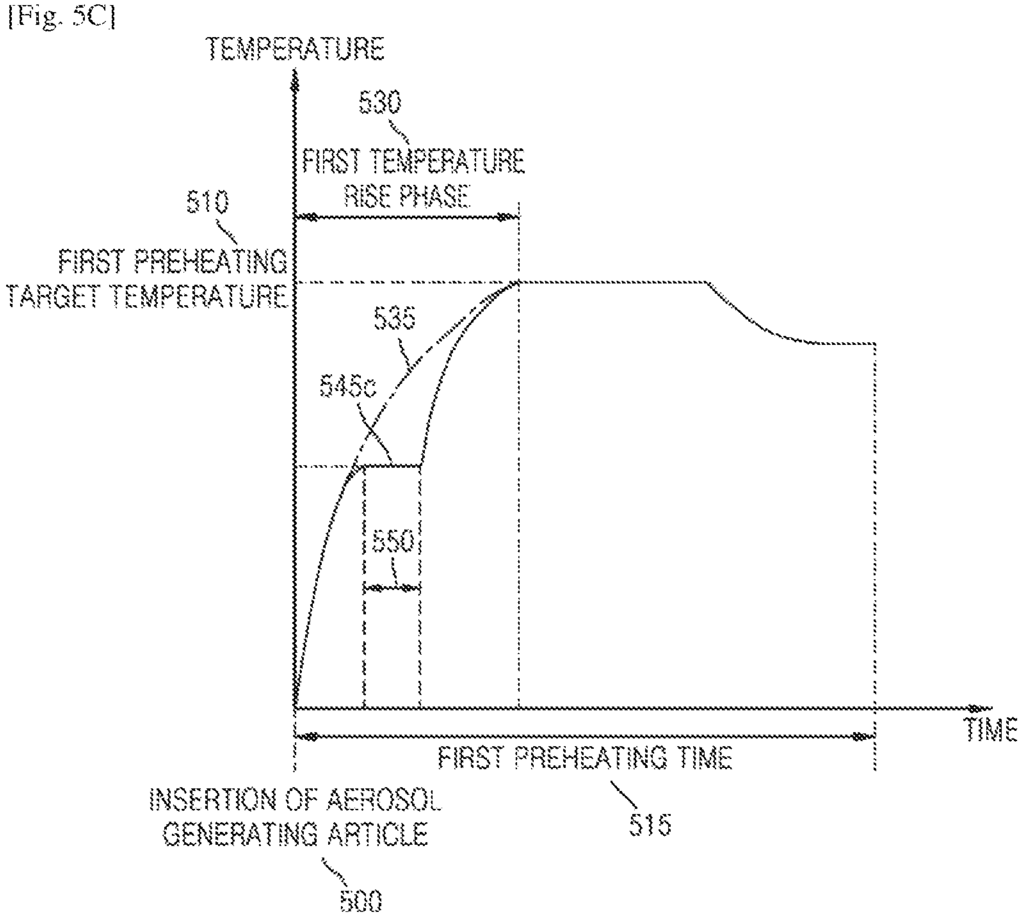
[Fig. 6]
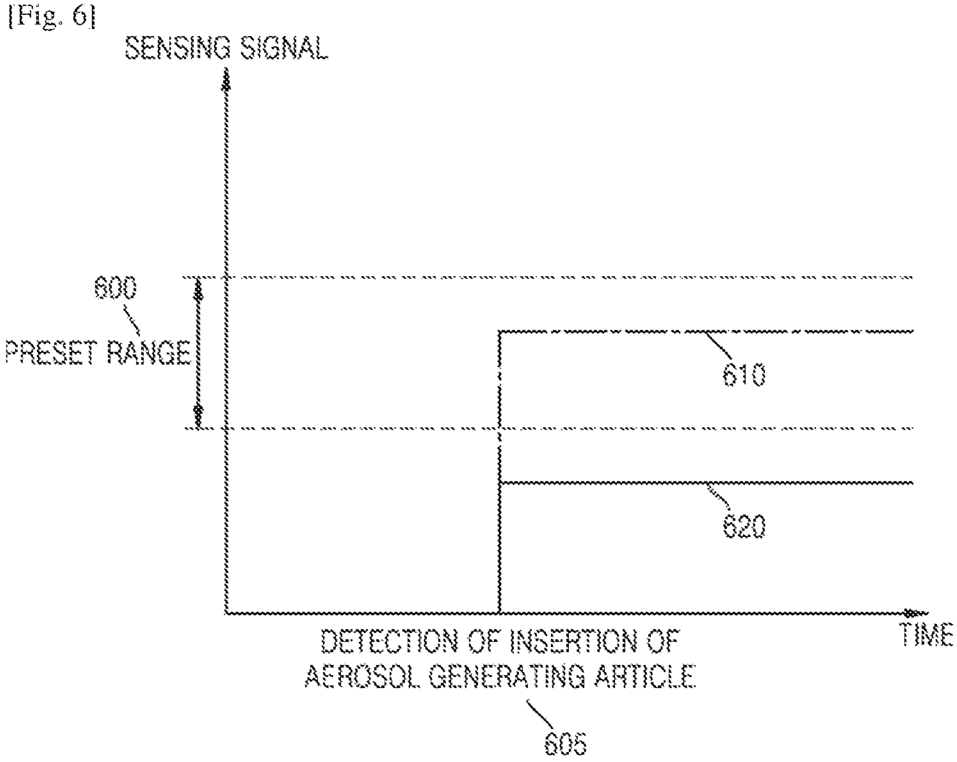

[Fig. 7]
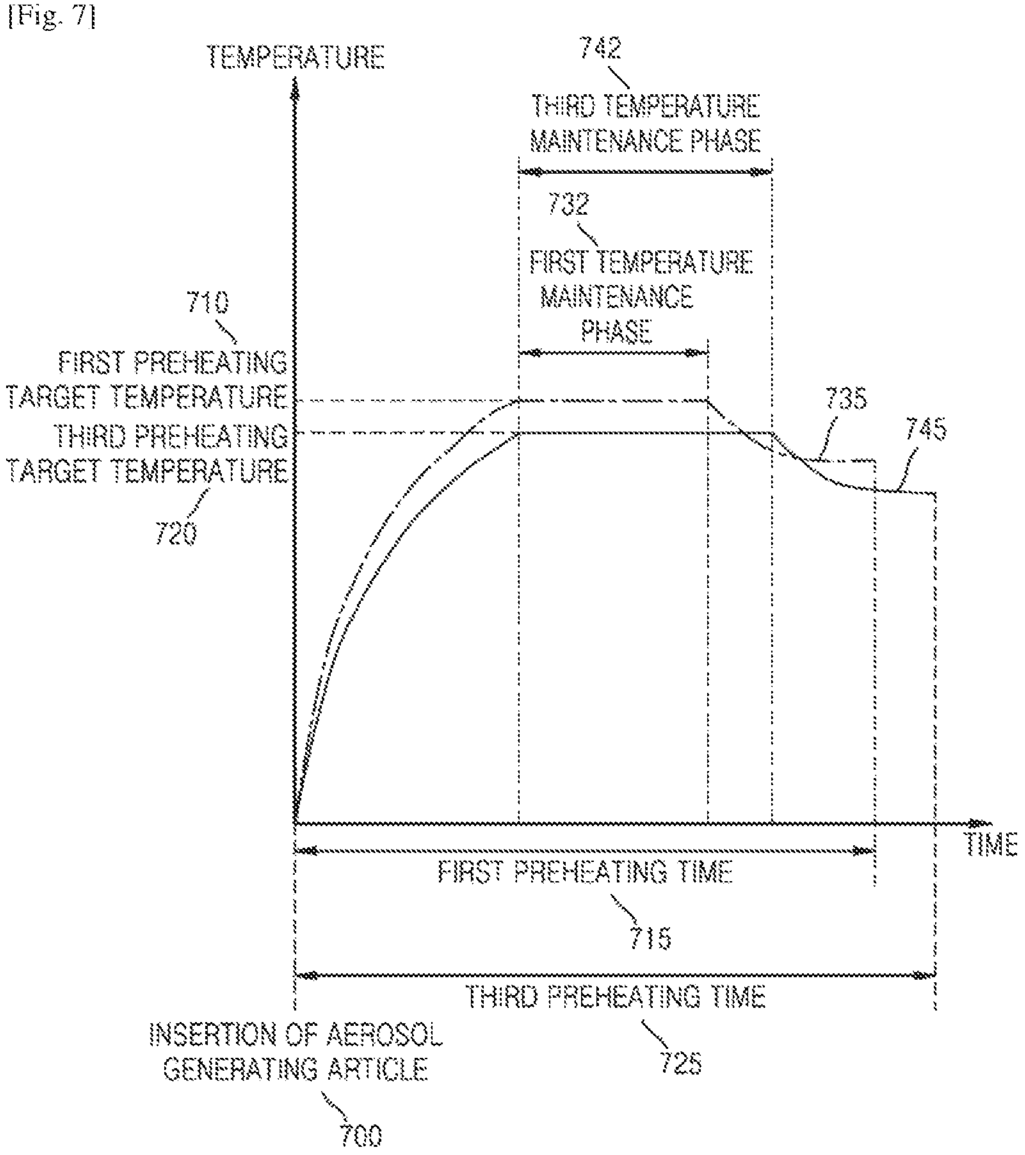

[Fig. 8]
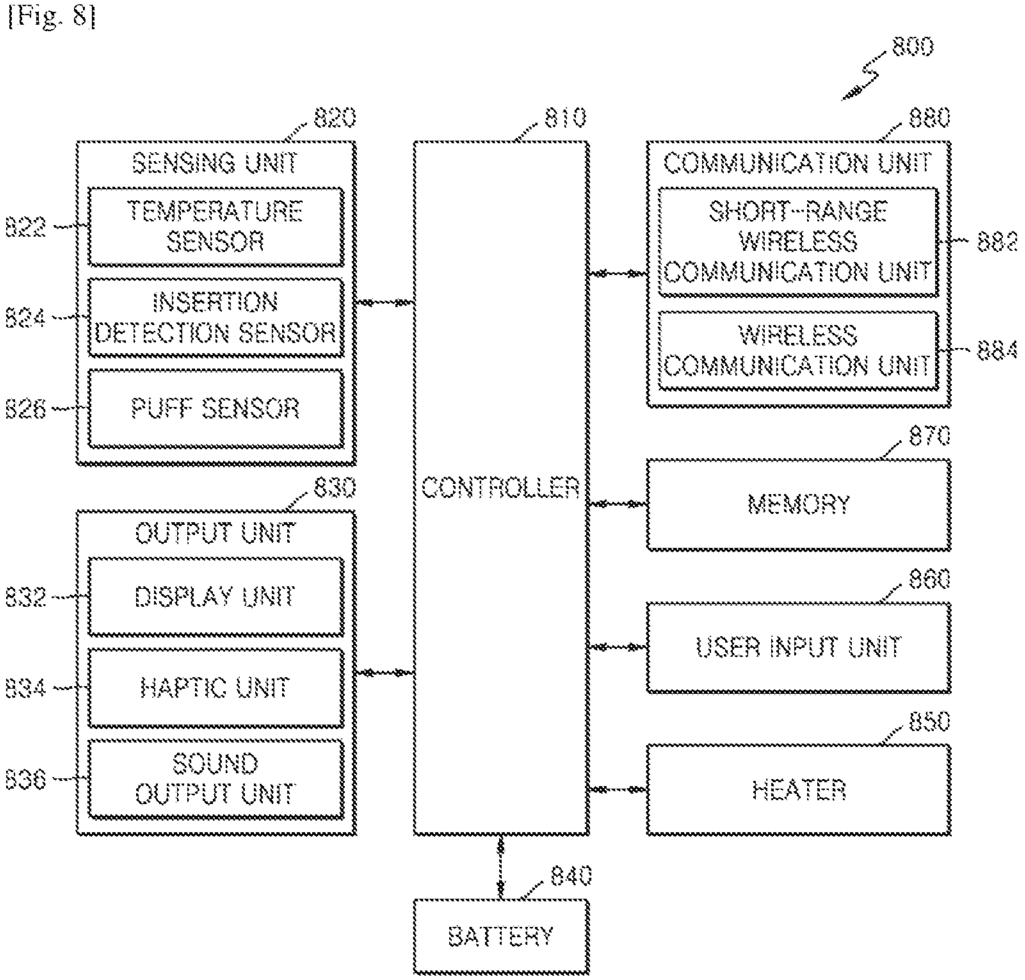

AEROSOL GENERATING DEVICE FOR CONTROLLING POWER SUPPLY TO HEATER AND OPERATING METHOD THEREOF

This Application is a National Stage of International Application No. PCT/KR2022/011788 filed Aug. 8, 2022, claiming priority based on Korean Patent Application No. 10-2021-0117109 filed Sep. 2, 2021.

TECHNICAL FIELD

One or more embodiments relate to an aerosol generating device for controlling power supply to a heater according to a preheating temperature profile, and an operating method of the aerosol generating device.

BACKGROUND ART

Recently, the demand for alternative methods for overcoming the shortcomings of general cigarettes has increased. For example, there is an increasing demand for a system for generating aerosols by heating a cigarette or an aerosol generating material by using an aerosol generating device, rather than by burning cigarettes.

When an aerosol generating article is inserted into an accommodation space of an aerosol generating device, the aerosol generating device may heat the aerosol generating article (e.g., a cigarette or a cartridge) according to a preset temperature profile. A temperature profile may refer to temperature change data of a heater or an aerosol generating article during a smoking operation. Aerosols generated as an aerosol generating article is heated may differ depending on the composition of an aerosol generating material in an aerosol generating article. For example, the temperature and an amount of generated aerosols may differ depending on an amount of moisture in an aerosol generating material.

DISCLOSURE OF INVENTION

Technical Problem

When an aerosol generating article includes a certain amount of moisture, aerosols having an appropriate temperature and amount may be generated as the aerosol generating article is preheated. However, when an amount of moisture in the aerosol generating article is greater than an appropriate range, a temperature increase rate of a heater decreases during preheating due to moisture. In this case, excess water vapor may be generated. Also, the aerosols may have a high temperature because the preheating time is extended until the heater reaches a preset target temperature. On the other hand, when the amount of moisture in the aerosol generating article is less than an appropriate range, it may be difficult to generate a sufficient amount of aerosols during preheating. Accordingly, there is a need for an aerosol generating device capable of differently setting a preheating temperature profile according to an amount of moisture of an aerosol generating article.

The technical problems to be solved by the embodiments of the present disclosure are not limited to the above-described problems, and problems that are not mentioned will be clearly understood by those of ordinary skill in the art from the present disclosure and the accompanying drawings.

Solution to Problem

According to an aspect of the present disclosure, an aerosol generating device may include a heater configured to heat an aerosol generating article, a sensor configured to output a signal indicating a change in capacitance which occurs by insertion of the aerosol generating article, and a processor electrically connected to the beater and the sensor, wherein the processor may set a preheating temperature profile for the heater on the basis of the signal output from the sensor, and supply power to the heater according to the set preheating temperature profile.

According to another aspect of the present disclosure, an operating method of an aerosol generating device may include sensing a change in capacitance which occurs by insertion of an aerosol generating article through a sensor, outputting a signal indicating the change in capacitance, setting a preheating temperature profile for a heater on the basis of the signal output from the sensor, and supplying power to the heater according to the set preheating temperature profile.

Advantageous Effects of Invention

According to various embodiments of the present disclosure, the temperature and the amount of generated aerosols may be appropriately controlled by setting a preheating temperature profile according to an amount of moisture of an aerosol generating article.

However, technical problems to be solved by the embodiments are not limited to the above-described problems, and problems that are not mentioned will be clearly understood by those of ordinary skill in the art from the present disclosure and the accompanying drawings.

BRIEF DESCRIPTION OF DRAWINGS

FIG. 1 is a block diagram of an aerosol generating device according to an embodiment.

FIG. 2 is a flowchart illustrating a method by which an aerosol generating device controls power supply.

FIG. 3 shows an example of a preheating temperature profile of an aerosol generating device according to an embodiment.

FIG. 4 is a graph of an output signal according to a state of an aerosol generating article according to an embodiment.

FIG. 5A shows an example of a preheating temperature profile of a heater according to an embodiment.

FIG. 5B shows an example of a preheating temperature profile of a heater according to another embodiment.

FIG. 5C shows an example of a preheating temperature profile of a heater according to another embodiment.

FIG. 6 is a graph of an output signal according to a state of an aerosol generating article according to an embodiment.

FIG. 7 shows an example of a preheating temperature profile of a heater according to an embodiment.

FIG. 8 is a block diagram of an aerosol generating device according to another embodiment.

BEST MODE FOR CARRYING OUT THE INVENTION

Regarding the terms in the various embodiments, the general terms which are currently and widely used are selected in consideration of functions of structural elements in the various embodiments of the present disclosure. However, meanings of the terms can be changed according to intention, a judicial precedence, the appearance of a new technology, and the like. In addition, in certain cases, terms which can be arbitrarily selected by the applicant in particular cases. In such a case, the meaning of the terms will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

As used herein, hen an expression such as "at least any one" precedes arranged elements, it modifies all elements rather than each arranged element. For example, the expression "at least any one of a, b, and c" should be construed to include a, b, c, or a and b, a and c, b and c, or a, b, and c.

In an embodiment, an aerosol generating device may be a device that generates aerosols by electrically heating a cigarette accommodated in an interior space thereof.

The aerosol generating device may include a heater. In an embodiment, the heater may be an electro-resistive heater. For example, the heater may include an electrically conductive track, and the heater may be heated when currents flow through the electrically conductive track.

The heater may include a tube-shaped heating element, a plate-shaped heating element, a needle-shaped heating element, or a rod-shaped heating element, and may heat the inside or outside of a cigarette according to the shape of a heating element.

A cigarette may include a tobacco rod and a filter rod. The tobacco rod may be formed of sheets, strands, and tiny bits cut from a tobacco sheet. Also, the tobacco rod may be surrounded by a heat conductive material. For example, the heat conductive material may be, but is not limited to, a metal foil such as aluminum foil.

The filter rod may include a cellulose acetate filter. The filter rod may include at least one segment. For example, the filter rod may include a first segment configured to cool aerosols, and a second segment configured to filter a certain component in aerosols.

In another embodiment, the aerosol generating device may be a device that generates aerosols by using a cartridge containing an aerosol generating material.

The aerosol generating device may include a cartridge that contains an aerosol generating material, and a main body that supports the cartridge. The cartridge may be detachably coupled to the main body, but is not limited thereto. The cartridge may be integrally formed or assembled with the main body, and may also be fixed to the main body so as not to be detached from the main body by a user. The cartridge may be mounted on the main body while accommodating an aerosol generating material therein. However, the present disclosure is not limited thereto. An aerosol generating material may also be injected into the cartridge while the cartridge is coupled to the main body.

The cartridge may contain an aerosol generating material in any one of various states, such as a liquid state, a solid state, a gaseous state, a gel state, or the like. The aerosol generating material may include a liquid composition. For example, the liquid composition may be a liquid including a tobacco-containing material having a volatile tobacco flavor component, or a liquid including a non-tobacco material.

The cartridge may be operated by an electrical signal or a wireless signal transmitted from the main body to perform a function of generating aerosols by converting the phase of an aerosol generating material inside the cartridge into a gaseous phase. The aerosols may refer to a gas in which vaporized particles generated from an aerosol generating material are mixed with air.

In another embodiment, the aerosol generating device may generate aerosols by heating a liquid composition, and generated aerosols may be delivered to a user through a cigarette. That is, the aerosols generated from the liquid composition may move along an airflow passage of the aerosol generating device, and the airflow passage may be configured to allow aerosols to be delivered to a user by passing through a cigarette.

In another embodiment, the aerosol generating device may be a device that generates aerosols from an aerosol generating material by using an ultrasonic vibration method. At this time, the ultrasonic vibration method may mean a method of generating aerosols by converting an aerosol generating material into aerosols with ultrasonic vibration generated by a vibrator.

The aerosol generating device may include a vibrator, and generate a short-period vibration through the vibrator to convert an aerosol generating material into aerosols. The vibration generated by the vibrator may be ultrasonic vibration, and the frequency band of the ultrasonic vibration may be in a frequency band of about 100 kHz to about 3.5 MHz, but is not limited thereto.

The aerosol generating device may further include a wick that absorbs an aerosol generating material. For example, the wick may be arranged to surround at least one area of the vibrator, or may be arranged to contact at least one area of the vibrator.

As a voltage (for example, an alternating voltage) is applied to the vibrator, heat and/or ultrasonic vibrations may be generated from the vibrator, and the heat and/or ultrasonic vibrations generated from the vibrator may be transmitted to the aerosol generating material absorbed in the wick. The aerosol generating material absorbed in the wick may be converted into a gaseous phase by heat and/or ultrasonic vibrations transmitted from the vibrator, and as a result, aerosols may be generated.

For example, the viscosity of the aerosol generating material absorbed in the wick may be lowered by the heat generated by the vibrator, and as the aerosol generating material having a lowered viscosity is granulated by the ultrasonic vibrations generated from the vibrator, aerosols may be generated, but is not limited thereto.

In another embodiment, the aerosol generating device is a device that generates aerosols by heating an aerosol generating article accommodated in the aerosol generating device in an induction heating method.

The aerosol generating device may include a susceptor and a coil. In an embodiment, the coil may apply a magnetic field to the susceptor. As power is supplied to the coil from the aerosol generating device, a magnetic field may be formed inside the coil. In an embodiment, the suspector may be a magnetic body that generates heat by an external magnetic field. As the suspector is positioned inside the coil and a magnetic field is applied to the suspector, the suspector generates heat to heat an aerosol generating article. In addition, optionally, the suspector may be positioned within the aerosol generating article.

In another embodiment, the aerosol generating device may further include a cradle.

The aerosol generating device may configure a system together with a separate cradle. For example, the cradle may charge a battery of the aerosol generating device. Alternatively, the heater may be heated when the cradle and the aerosol generating device are coupled to each other.

Hereinafter, the present disclosure will now be described more fully with reference to the accompanying drawings, in which exemplary embodiments of the present disclosure are shown such that one of ordinary skill in the art may easily work the present disclosure. The present disclosure may be implemented in a form that can be implemented in the aerosol generating devices of the various embodiments described above or may be implemented in various different forms, and is not limited to the embodiments described herein.

Hereinafter, embodiments of the present disclosure will be described in detail with reference to the drawings.

FIG. 1 is a block diagram of an aerosol generating device 100 according to an embodiment.

Referring to FIG. 1, the aerosol generating device 100 may include a processor 110, a heater 120, and a sensor 130. Components of the aerosol generating device 100 according to an embodiment are not limited thereto, and other components may be added or at least one component may be omitted according to an embodiment.

In an embodiment, the heater 120 may heat at least a portion of an aerosol generating article. For example, the heater 120 may heat at least a portion of the aerosol generating article as power is supplied under control of the processor 110. The at least a portion of the aerosol generating article may refer to a tobacco rod including at least one of an aerosol generating article and a tobacco material. In an embodiment, the heater 120 may receive power according to a temperature profile corresponding to each of a preheating phase and a heating phase through the processor 110. For example, the heater 120 may receive power according to a preheating temperature profile corresponding to a preheating phase through the processor 110. The preheating temperature profile may include a temperature rise phase, a temperature maintenance phase, and a temperature drop phase. The preheating temperature profile will be described in more detail below.

In an embodiment, the sensor 130 may be a capacitive sensor that senses a change in capacitance. For example, the sensor 130 may sense a change in capacitance in an accommodation space into which an aerosol generating article is inserted. In addition, the sensor 130 may output a signal according to the sensed change in capacitance. In the present disclosure, a 'signal' may mean a voltage change signal, a frequency change signal, or a charge/discharge time change signal corresponding to a change in capacitance in the accommodation space.

In an embodiment, the sensor 130 may include at least one electrode made of a metal thin film. For example, the sensor 130 may include at least one electrode made of copper foil.

In an embodiment, the processor 110 may control general operations of the aerosol generating device 100. In an embodiment, the processor 110 may obtain various pieces of data on the basis of a signal output from the sensor 130. For example, the processor 110 may obtain data on insertion/removal of an aerosol generating article, a state of an inserted aerosol generating article (e.g., an over-wet state, a dry state, and a general state), etc. on the basis of a signal output from the sensor 130.

In an embodiment, the processor 110 may supply power to the heater 120 on the basis of an output signal obtained from the sensor 130, which will be described in more detail below.

FIG. 2 is a flowchart illustrating a method by which an aerosol generating device controls power supply.

The aerosol generating article may be inserted into the aerosol generating device 100 through an accommodation space that is a space formed in a portion of the aerosol generating device 100. Referring to FIG. 2, in operation 201, an aerosol generating device (e.g., the aerosol generating device 100 of FIG. 1) may sense a change in capacitance according to the insertion of an aerosol generating article through a sensor (e.g., the sensor 130 of FIG. 1) and output a signal.

In an embodiment, the aerosol generating device 100 may output a voltage change signal as a signal indicating a change in capacitance through the sensor 130. For example, when a capacitance in the accommodation space increases by a first change amount as the aerosol generating article is inserted into the accommodation space, the aerosol generating device 100 may obtain a voltage change signal corresponding the first change amount through the sensor 130. The obtained voltage change signal may include data on a voltage increase that has occurred as a charging voltage of the sensor 130 increases.

In another embodiment, the aerosol generating device 100 may output a frequency change signal as a signal for a change in capacitance through the sensor 130. For example, when a capacitance in the accommodation space increases by a first change amount as the aerosol generating article is inserted into the accommodation space, the aerosol generating device 100 may obtain a frequency change signal corresponding the first change amount through the sensor 130. The obtained frequency change signal may include data on an amount of frequency increase that has occurred as an oscillation frequency increases in an oscillation circuit connected to the sensor 130.

In another embodiment, the aerosol generating device 100 may output a charge/discharge time change signal as a signal for a change in capacitance through the sensor 130. For example, when a capacitance in the accommodation space increases by a first change amount as the aerosol generating article is inserted into the accommodation space, the aerosol generating device 100 may obtain a charge/discharge time change signal corresponding the first change amount through the sensor 130. The obtained charge/discharge time change signal may include data on an amount of a charge/discharge time increase that has occurred as a charging time for the sensor 130 increases (or as a discharging time decreases).

According to an embodiment, in operation 203, the aerosol generating device 100 may set, through a processor (e.g., the processor 110 of FIG. 1), a preheating temperature profile for a heater (e.g., the heater 120 of FIG. 1) on the basis of a signal output from the sensor 130.

In an embodiment, the processor 110 may obtain data on a state of an aerosol generating article on the basis of a signal output from the sensor 130. In the present disclosure, the "state of an aerosol generating article" may mean a state according to an amount of water ($H_2O$) contained in the aerosol generating article.

In an embodiment, when an amount of water contained in an aerosol generating material of an aerosol generating article and/or a tobacco rod including a tobacco material is within an appropriate range, the state of the aerosol generating article may be referred to as a 'general state'. For example, when a voltage change signal is output from the sensor 130, the processor 110 may detect whether the output signal falls within a preset voltage change range. When an output signal falls within the preset voltage change range, the processor 110 may determine that a state of an inserted aerosol generating article is a general state. Here, the general state may mean a state in which a tobacco rod of an aerosol generating article includes moisture in a range of about 8 wt % to about 15 wt % with respect to a total weight of the tobacco rod.

In another embodiment, when an amount of water contained in an aerosol generating material of an aerosol generating article and/or a tobacco rod including a tobacco material exceeds an appropriate range, the state of the aerosol generating article may be referred to as an 'over-wet state'. For example, when a voltage change signal output from the sensor 130 exceeds the preset voltage change range, the processor 110 may detect that a state of an inserted aerosol generating article is an over-wet state. Here, the over-wet state may mean a state in which a tobacco rod of an aerosol generating article includes moisture in an amount exceeding about 15 wt % with respect to a total weight of the tobacco rod.

In another embodiment, when an amount of water contained in an aerosol generating material of an aerosol generating article and/or a tobacco rod including a tobacco material is less than an appropriate range, the state of the aerosol generating article may be referred to as a 'dry state'. For example, a voltage change signal output from the sensor 130 is less than the preset voltage change range, the processor 110 may detect that a state of an inserted aerosol generating article is a dry state. Here, the dry state may mean a state in which a tobacco rod of an aerosol generating article includes moisture in an amount less than about 8 wt % with respect to a total weight of the tobacco rod.

In an embodiment, the processor 110 may set a preheating temperature profile according to data on a state of an aerosol generating article. For example, when the state of the aerosol generating article is a general state, the processor 110 may set the preheating temperature profile to a first temperature profile. As another example, when the state of the aerosol generating article is an over-wet state, the processor 110 may set the preheating temperature profile to a second temperature profile. As another example, when the state of the aerosol generating article is a dry state, the processor 110 may set the preheating temperature profile to a third temperature profile. The first temperature profile, the second temperature profile, and the third temperature profile may be different from one another, which will be described in more detail below.

According to an embodiment, in operation 205, the aerosol generating device 100 may supply power to the heater 120 according to the preheating temperature profile through the processor 110. For example, the processor 110 may control power supply to the heater 120 by a pulse width modulation (PWM) method. The PWM method is a method of controlling power supplied to the heater 120 by adjusting a duty ratio during a certain period. The processor 110 may supply power to the heater 120 by differently adjusting a duty ratio according to a set preheating temperature profile.

FIG. 3 shows an example of a preheating temperature profile of an aerosol generating device according to an embodiment.

Referring to FIG. 3, a processor (e.g., the processor 110 of FIG. 1) may detect insertion 300 of an aerosol generating article. For example, the processor 110 may detect insertion 300 of an aerosol generating article on the basis of a signal obtained through a sensor (e.g., the sensor 130 of FIG. 1). For example, the processor 110 may detect insertion 300 of the aerosol generating article on the basis of at least one of a voltage change signal, a frequency change signal, and a charge/discharge time change signal obtained through the sensor 130. As another example, the processor 110 may also detect insertion operation 300 of an aerosol generating article through a separate sensor (e.g., a pressure sensor, an inductive sensor, an infrared sensor, or the like).

In an embodiment, when insertion 300 of an aerosol generating article is detected, the processor 110 may perform a preheating operation on the aerosol generating article according to a preheating temperature profile for a preheating time 305. The preheating temperature profile may include a temperature rise phase 310, a temperature maintenance phase 312, and a temperature drop phase 314.

In an embodiment, the temperature rise phase 310 may mean a phase in which the temperature of a heater (e.g., the heater 120 of FIG. 1) rises to a preheating target temperature 320. After insertion 300 of an aerosol generating article is detected, the processor 110 may supply power to the heater 120 such that the temperature of the heater 120 rises to the preheating target temperature 320 in the temperature rise phase 310. In the present disclosure, the preheating target temperature 320 may mean a temperature to which the beater 120 is required to be preheated before actually heating an aerosol generating article.

In an embodiment, the temperature maintenance phase 312 may mean a phase in which the temperature of the heater 120 is maintained at the preheating target temperature 320. After the temperature of the heater 120 reaches the preheating target temperature 320, the processor 110 may supply power to the heater 120 such that the temperature of the heater 120 is maintained at the preheating target temperature 320 in the temperature maintenance phase 312.

In an embodiment, the temperature drop phase 314 may mean a phase in which the temperature of the heater 120 drops from the preheating target temperature 320 to a preheating end temperature 325. After the temperature of the heater 120 is maintained at the preheating target temperature 320 for a preset maintenance time, the processor 110 may supply power to the heater 120 such that the temperature of the heater 120 drops to the preheating end temperature 325 in the temperature drop phase 314.

FIG. 4 is a graph of an output signal according to a state of an aerosol generating article according to an embodiment.

Referring to FIG. 4, a processor (e.g., the processor 110 of FIG. 1) may detect whether a signal output from a sensor (e.g., the sensor 130 of FIG. 1) falls within a preset range. For example, when insertion 405 of an aerosol generating article is detected, the processor 110 may obtain a signal output from the sensor 130 and detect whether the obtained signal falls within a preset range 400. The preset range 400 may be a reference range for setting a preheating temperature profile for preheating a heater (e.g., the heater 120 of FIG. 1). That is, the processor 110 may control power supply by setting different preheating temperature profiles for the heater 120 based on whether the obtained signal falls within, exceeds, or is less than the preset range 400.

In an embodiment, when a first output signal 410 obtained from the sensor 130 falls within the preset range 400, the processor 110 may set a preheating temperature profile for preheating the heater 120 to a first temperature profile. The first output signal 410 may be an output signal corresponding to a first capacitance change which is a difference between a capacitance in a state in which an aerosol generating article is not inserted in an accommodation space and a capacitance in a state in which an aerosol generating article in a general state is inserted in the accommodation space.

For example, a signal output through the sensor 130 may be a voltage change signal indicating 2.5 V increase, and a preset voltage change range may be about 2 V to about 3.2 V. In this case, the processor 110 may determine that the signal falls within the preset range 400, and set the preheating temperature profile to the first temperature profile.

As another example, a signal output through the sensor 130 may be a frequency change signal indicating 1.2 MHz increase, and a preset frequency change range may be about 1 MHz to about 2 MHz. In this case, the processor 110 may determine that the signal falls within the preset range 400, and set the preheating temperature profile to the first temperature profile.

As another example, a signal output through the sensor 130 may be a charging time change signal indicating 1 second increase (or a discharging time changing signal indicating 1 second decrease), and a preset charge/discharge time change range may be about 0.8 seconds to about 1.5 seconds. In this case, the processor 110 may determine that the signal falls within the preset range 400, and set the preheating temperature profile to the first temperature profile.

In another embodiment, when a second output signal 420 obtained from the sensor 130 exceeds the preset range 400, the processor 110 may set the preheating temperature profile for preheating the heater 120 to a second temperature profile. Here, the second output signal 420 may be an output signal corresponding to a second capacitance change which is a difference between a capacitance in a state in which an aerosol generating article is not inserted in an accommodation space and a capacitance in a state in which an aerosol generating article in an over-wet state is inserted in the accommodation space.

For example, a signal output through the sensor 130 may be a voltage change signal indicating 3.5 V increase, and a preset voltage change range may be about 2 V to about 3.2 V. In this case, the processor 110 may determine that the signal exceeds the preset range 400, and set the preheating temperature profile to the second temperature profile.

As another example, a signal output through the sensor 130 may be a frequency change signal indicating 2.3 MHz increase, and a preset frequency change range may be about 1 MHz to about 2 MHz. In this case, the processor 110 may determine that the signal exceeds the preset range 400, and set the preheating temperature profile to the second temperature profile.

As another example, a signal output through the sensor 130 may be a charging time change signal indicating 1.7 second increase (or a discharging time changing signal indicating 1.7 second decrease), and a preset charge/discharge time change range may be about 0.8 seconds to about 1.5 seconds. In this case, the processor 110 may determine that the signal exceeds the preset range 400, and set the preheating temperature profile to the second temperature profile.

In an embodiment, the first temperature profile may be different from the second temperature profile, which will be described in more detail below with reference to FIGS. 5A to 5C.

FIG. 5A shows an example of a preheating temperature profile of a heater according to an embodiment.

Referring to FIG. 5A, a processor (e.g., the processor 110 of FIG. 1) may detect insertion 500 of an aerosol generating article. For example, the processor 110 may detect insertion 500 of an aerosol generating article on the basis of a signal obtained through a sensor (e.g., the sensor 130 of FIG. 1).

In an embodiment, when a first output signal (e.g., the first output signal 410 of FIG. 4) is obtained as insertion 500 of an aerosol generating article is detected, the processor 110 may set a preheating temperature profile for preheating a heater (e.g., the heater 120 of FIG. 1) to a first temperature profile 535. In an embodiment, as the processor 110 sets the preheating temperature profile to the first temperature profile 535, the processor 110 may perform a preheating operation on an aerosol generating article on the basis of the first temperature profile 535 during a first preheating time 515.

In an embodiment, when a second output signal (e.g., the second output signal 420 of FIG. 4) is obtained as insertion 500 of an aerosol generating article is detected, the processor 110 may set the preheating temperature profile for preheating the heater 120 to a second temperature profile 545*a*. In an embodiment, as the processor 110 sets the preheating temperature profile to the second temperature profile 545*a*, the processor 110 may perform a preheating operation on an aerosol generating article on the basis of the second temperature profile 545*a* for a second preheating time 525. As shown in FIG. 5A, the second preheating time 525 may be shorter than the first preheating time 515.

In an embodiment, the second temperature profile 545*a* may include a shorter temperature rise phase than that of the first temperature profile 535. For example, when the preheating temperature profile for the heater 120 is set to the first temperature profile 535, the processor 110 may supply power to the heater 120 during a first temperature rise phase 530 such that the temperature of the heater 120 is increased to a first preheating target temperature 510. As another example, when the preheating temperature profile for the heater 120 is set to the second temperature profile 545*a*, the processor 110 may supply power to the heater 120 during a second temperature rise phase 540 such that the temperature of the heater 120 is increased to a second preheating target temperature 520. The second preheating target temperature 520 may be less than the first preheating target temperature 510 by about 2° C. to about 3° C.

In an embodiment, in the first temperature rise phase 530 and the second temperature rise phase 540, the beater 120 may be heated at the same rate, but the second preheating target temperature 520 of the second temperature profile 545*a* may be lower than the first preheating target temperature 510 of the first temperature profile 535. Accordingly, the second temperature rise phase 540 may be shorter than the first temperature rise phase 530, and the second preheating time 525 may be shorter than the first preheating time 515.

When the heater 120 is heated with a preheating temperature profile having a low preheating target temperature, such as the second temperature profile 545*a*, the temperature of mainstream smoke may be lowered and thus user's discomfort due to an aerosol generating article in an over-wet state may be alleviated. In general, when an aerosol generating article in an over-wet state is inserted into the aerosol generating device 100, a temperature increase rate of the heater 120 may decrease due to a large amount of moisture. Accordingly, the temperature of mainstream smoke may increase as the aerosol generating article is substantially heated at a high temperature for the extended time. According to an embodiment, as described above, the heater 120 is preheated based on a preheating temperature profile in which a preheating target temperature thereof is set to be low, and thus the user's discomfort due to an increase in the temperature of mainstream smoke may be prevented.

FIG. 5B shows an example of a preheating temperature profile of a heater according to another embodiment.

Referring to FIG. 5B, a processor (e.g., the processor 110 of FIG. 1) may detect insertion 500 of an aerosol generating article. For example, the processor 110 may detect insertion 500 of an aerosol generating article on the basis of a signal obtained through a sensor (e.g., the sensor 130 of FIG. 1).

In an embodiment, when a first output signal (e.g., the first output signal 410 of FIG. 4) is obtained as insertion 500 of an aerosol generating article is detected, the processor 110 may set a preheating temperature profile for preheating a heater (e.g., the heater 120 of FIG. 1) to the first temperature profile 535. In an embodiment, as the processor 110 sets the preheating temperature profile to the first temperature profile 535, the processor 110 may perform a preheating operation on an aerosol generating article on the basis of the first temperature profile 535 for the first preheating time 515.

In an embodiment, when a second output signal (e.g., the second output signal 420 of FIG. 4) is obtained as insertion 500 of an aerosol generating article is detected, the processor 110 may set the preheating temperature profile for preheating the heater 120 to a second temperature profile 545*b*. In an embodiment, as the processor 110 sets the preheating temperature profile to the second temperature profile 545*b*, the processor 110 may perform a preheating operation on an aerosol generating article on the basis of the second temperature profile 545*b* for the second preheating time 525. As shown in FIG. 5B, the second preheating time 525 may be shorter than the first preheating time 515.

In an embodiment, the second temperature profile 545*b* may include a shorter temperature maintenance phase than that of the first temperature profile 535. For example, when the preheating temperature profile for the heater 120 is set to the first temperature profile 535, the processor 110 may supply power to the heater 120 during a first temperature maintenance phase 532 such that the temperature of the heater 120 is maintained at the first preheating target temperature 510. On the other hand, when the preheating temperature profile for the heater 120 is set to the second temperature profile 545*b*, the processor 110 may supply power to the heater 120 during a second temperature maintenance phase 542 such that the temperature of the heater 120 is maintained at the first preheating target temperature 510. The second temperature maintenance phase 542 may be shorter than the first temperature maintenance phase 532.

FIG. 5C shows an example of a preheating temperature profile of a heater according to another embodiment.

Referring to FIG. 5C, a processor (e.g., the processor 110 of FIG. 1) may detect insertion 500 of an aerosol generating article. For example, the processor 110 may detect insertion 500 of an aerosol generating article on the basis of a signal obtained through a sensor (e.g., the sensor 130 of FIG. 1).

In an embodiment, when a first output signal (e.g., the first output signal 410 of FIG. 4) is obtained as insertion 500 of an aerosol generating article is detected, the processor 110 may set a preheating temperature profile for preheating a heater (e.g., the heater 120 of FIG. 1) to the first temperature profile 535. In an embodiment, as the processor 110 sets the preheating temperature profile to the first temperature profile 535, the processor 110 may perform a preheating operation on an aerosol generating article on the basis of the first temperature profile 535 for the first preheating time 515.

On the other hand, when a second output signal (e.g., the second output signal 420 of FIG. 4) is obtained as insertion operation 500 of an aerosol generating article is detected, the processor 110 may set the preheating temperature profile for preheating the heater 120 to a second temperature profile 545*c*. In an embodiment, as the processor 110 sets the preheating temperature profile to the second temperature profile 545*c*, the processor 110 may perform a preheating operation on an aerosol generating article on the basis of the second temperature profile 545*c* for the first preheating time 515.

In an embodiment, the second temperature profile 545*c* may include the same length of the temperature rise phase as the first temperature profile 535. That is, whether the preheating temperature profile for the heater 120 is set to the first temperature profile 535 or the second temperature profile 545*c*, the processor 110 may supply power to the heater 120 during the first temperature rise phase 530 such that the temperature of the heater 120 is increased to the first preheating target temperature 510. However, the second temperature profile 545*c* may include a drying phase 550, unlike the first temperature profile 535. Here, the drying phase 550 may mean a phase for evaporating at least a portion of moisture contained in an aerosol generating article.

In an embodiment, as the drying phase 550 is included in the second temperature profile 545*c*, moisture of an aerosol generating article in an over-wet state may be evaporated in advance. After some moisture has been evaporated the drying phase 550, the aerosol generating article may be in a state similar to a general state. Thus, thereafter, the aerosol generating article may be preheated to reach the first preheating target temperature 510 at the same time as the case of the first temperature profile 535. In addition, after the first preheating target temperature 510 is reached, the first temperature profile 535 and the second temperature profile 545*c* may regulate the heater temperature in the same manner.

In an embodiment, the drying phase 550 in the second temperature profile 545*c* may evaporate at least a portion of moisture contained in an aerosol generating article at a temperature ranging from about 100° C. to about 250° C. The temperature range may be predetermined such that moisture evaporates but an aerosol generating material (e.g., glycerin) is not vaporized, and is not limited to the above example range. In an embodiment, the heater temperature may be maintained during the drying phase 550.

FIG. 6 is a graph of an output signal according to a state of an aerosol generating article according to an embodiment.

Referring to FIG. 6, a processor (e.g., the processor 110 of FIG. 1) may detect whether a signal output from a sensor (e.g., the sensor 130 of FIG. 1) falls within a preset range. For example, when insertion 605 of an aerosol generating article is detected, the processor 110 may obtain a signal output from the sensor 130 and detect whether the obtained signal falls within a preset range 600. The preset range 600 may be a reference range for setting a preheating temperature profile for preheating a heater (e.g., the heater 120 of FIG. 1).

In an embodiment, when a first output signal 610 obtained from the sensor 130 falls within the preset range 600, the processor 110 may set a preheating temperature profile for preheating the heater 120 to a first temperature profile. The first output signal 610 may be an output signal corresponding to a first capacitance change which is a difference between a capacitance in a state in which an aerosol generating article is not inserted in an accommodation space and a capacitance in a state in which an aerosol generating article in a general state is inserted in the accommodation space.

For example, a signal output through the sensor 130 may be a voltage change signal indicating 2.5 V increase, and a preset voltage change range may be about 2 V to about 3.2 V. In this case, the processor 110 may determine that the signal falls within the preset range 600, and set the preheating temperature profile as the first temperature profile.

As another example, a signal output through the sensor 130 may be a frequency change signal indicating 1.2 MHz increase, and a preset frequency change range may be about 1 MHz to about 2 MHz. In this case, the processor 110 may determine that the signal falls within the preset range 600, and set the preheating temperature profile to the first temperature profile.

As another example, a signal output through the sensor 130 may be a charging time change signal indicating 1 second increase (or a discharging time change signal indicating 1 second decrease), and a preset charge/discharge time change range may be about 0.8 seconds to about 1.5 seconds. In this case, the processor 110 may determine that the signal falls within the preset range 600, and set the preheating temperature profile to the first temperature profile.

In another embodiment, when a third output signal 620 which is less than the preset range 600 is obtained from the sensor 130, the processor 110 may set the preheating temperature profile for preheating the heater 120 to a third temperature profile. Here, the third output signal 620 may be an output signal corresponding to a third capacitance change which is a difference between a capacitance in a state in which an aerosol generating article is not inserted in an accommodation space and a capacitance in a state in which an aerosol generating article in a dry state is inserted in the accommodation space.

For example, a signal output through the sensor 130 may be a voltage change signal indicating 1.8 V increase, and a preset voltage change range may be about 2 V to about 3.2 V. In this case, the processor 110 may determine that the signal is less than the preset range 600, and set the preheating temperature profile to a third temperature profile.

As another example, a signal output through the sensor 130 may be a frequency change signal indicating 0.9 MHz increase, and a preset frequency change range may be about 1 MHz to about 2 MHz. In this case, the processor 110 may determine that the signal is less than the preset range 600, and set the preheating temperature profile to a third temperature profile.

As another example, a signal output through the sensor 130 may be a charging time change signal indicating 0.5 second increase (or a discharging time change signal indicating 0.5 second decrease), and a preset charge/discharge time change range may be about 0.8 seconds to about 1.5 seconds. In this case, the processor 110 may determine that the signal is less than the preset range 600, and set the preheating temperature profile to a third temperature profile.

In an embodiment, the first temperature profile may be different from the third temperature profile, which will be described in more detail below with reference to FIG. 7.

FIG. 7 shows an example of a preheating temperature profile of a heater according to an embodiment.

Referring to FIG. 7, a processor (e.g., the processor 110 of FIG. 1) may detect insertion 700 of an aerosol generating article. For example, the processor 110 may detect insertion 700 of an aerosol generating article on the basis of a signal obtained through a sensor (e.g., the sensor 130 of FIG. 1).

In an embodiment, when a first output signal (e.g., the first output signal 610 of FIG. 6) is obtained as insertion operation 700 of an aerosol generating article is detected, the processor 110 may set a preheating temperature profile for preheating a heater (e.g., the heater 120 of FIG. 1) to a first temperature profile 735. In an embodiment, as the preheating temperature profile is set to the first temperature profile 735, the processor 110 may perform a preheating operation on an aerosol generating article on the basis of the first temperature profile 735 for a first preheating time 715.

In an embodiment, when a third output signal (e.g., the third output signal 620 of FIG. 6) is obtained as insertion operation 700 of an aerosol generating article is detected, the processor 110 may set the preheating temperature profile for preheating the heater 120 to a third temperature profile 745. In an embodiment, as the preheating temperature profile is set to the third temperature profile 745, the processor 110 may perform a preheating operation on an aerosol generating article on the basis of the third temperature profile 745 for a third preheating time 725. As shown in FIG. 7, the third preheating time 725 may be longer than the first preheating time 715.

In an embodiment, the third temperature profile 745 may have a lower preheating target temperature than that of the first temperature profile 735. For example, when the preheating temperature profile for the heater 120 is set to the first temperature profile 735, the processor 110 may supply power to the heater 120 such that the temperature of the heater 120 is increased to a first preheating target temperature 710. On the other hand, when the preheating temperature profile for the heater 120 is set to the third temperature profile 745, the processor 110 may supply power to the heater 120 such that the temperature of the heater 120 is increased to a third preheating target temperature 720.

In an embodiment, the third temperature profile 745 may include a longer temperature maintenance phase than that of the first temperature profile 735. For example, when the preheating temperature profile for the beater 120 is set to the first temperature profile 735, the processor 110 may supply power to the heater 120 during a first temperature maintenance phase 732 such that the temperature of the heater 120 is maintained at the first preheating target temperature 710. As another example, when the preheating temperature profile for the heater 120 is set to the third temperature profile 745, the processor 110 may supply power to the heater 120 during a third temperature maintenance phase 742 such that the temperature of the beater 120 is maintained at the third preheating target temperature 720. The third temperature maintenance phase 742 may be longer than the first temperature maintenance phase 732.

For an aerosol generating article in a dry state, when the heater 120 is heated with a preheating temperature profile having a low preheating target temperature and a long preheating time, such as the third temperature profile 745, carbonization of the aerosol generating article may be prevented. In general, when an aerosol generating article in a dry state is inserted into the aerosol generating device 100, a temperature increase rate of the heater 120 may increase due to a small amount of moisture. In this case, carbonization may occur as the aerosol generating article substantially rapidly reaches a high temperature. According to an embodiment, as described above, the heater 120 is preheated based on a preheating temperature profile in which a preheating target temperature thereof is set low and a preheating time thereof is set long. Accordingly, carbonization of the aerosol generating article may be prevented, and a taste of the aerosol generating article may be improved.

FIG. 8 is a block diagram of an aerosol generating device 800 according to another embodiment.

The aerosol generating device 800 may include a controller 810, a sensing unit 820, an output unit 830, a battery 840, a heater 850, a user input unit 860, a memory 870, and a communication unit 880. However, the internal structure of the aerosol generating device 800 is not limited to those illustrated in FIG. 8. That is, according to the design of the aerosol generating device 800, it will be understood by one of ordinary skill in the art that some of the components shown in FIG. 8 may be omitted or new components may be added.

The sensing unit 820 may sense a state of the aerosol generating device 800 and a state around the aerosol generating device 800, and transmit sensed information to the controller 810. Based on the sensed information, the controller 810 may control the aerosol generating device 800 to perform various functions, such as controlling an operation of the heater 850, limiting smoking, determining whether an aerosol generating article (e.g., a cigarette, a cartridge, or the like) is inserted, displaying a notification, or the like.

The sensing unit 820 may include at least one of a temperature sensor 822, an insertion detection sensor, and a puff sensor 826, but is not limited thereto.

The temperature sensor 822 may sense a temperature at which the heater 850 (or an aerosol generating material) is heated. The aerosol generating device 800 may include a separate temperature sensor for sensing the temperature of the heater 850, or the heater 850 may serve as a temperature sensor. Alternatively, the temperature sensor 822 may also be arranged around the battery 840 to monitor the temperature of the battery 840.

The insertion detection sensor 824 may sense insertion and/or removal of an aerosol generating article. For example, the insertion detection sensor 824 may include at least one of a film sensor, a pressure sensor, an optical sensor, a resistive sensor, a capacitive sensor, an inductive sensor, and an infrared sensor, and may sense a signal change according to the insertion and/or removal of an aerosol generating article.

The puff sensor 826 may sense a user's puff on the basis of various physical changes in an airflow passage or an airflow channel. For example, the puff sensor 826 may sense a user's puff on the basis of any one of a temperature change, a flow change, a voltage change, and a pressure change.

The sensing unit 820 may include, in addition to the temperature sensor 822, the insertion detection sensor 824, and the puff sensor 826 described above, at least one of a temperature/humidity sensor, a barometric pressure sensor, a magnetic sensor, an acceleration sensor, a gyroscope sensor, a location sensor (e.g., a global positioning system (GPS)), a proximity sensor, and a red-green-blue (RGB) sensor (illuminance sensor). Because a function of each of sensors may be intuitively inferred by one of ordinary skill in the art from the name of the sensor, a detailed description thereof may be omitted.

The output unit 830 may output information on a state of the aerosol generating device 800 and provide the information to a user. The output unit 830 may include at least one of a display unit 832, a haptic unit 834, and a sound output unit 836, but is not limited thereto. When the display unit 832 and a touch pad form a layered structure to form a touch screen, the display unit 832 may also be used as an input device in addition to an output device.

The display unit 832 may visually provide information about the aerosol generating device 800 to the user. For example, information about the aerosol generating device 800 may mean various pieces of information, such as a charging/discharging state of the battery 840 of the aerosol generating device 800, a preheating state of the heater 850, an insertion/removal state of an aerosol generating article, or a state in which the use of the aerosol generating device 800 is restricted (e.g., sensing of an abnormal object), or the like, and the display unit 832 may output the information to the outside. The display unit 832 may be, for example, a liquid crystal display panel (LCD), an organic light-emitting diode (OLED) display panel, or the like. In addition, the display unit 832 may be in the form of a light-emitting diode (LED) light-emitting device.

The haptic unit 834 may tactilely provide information about the aerosol generating device 800 to the user by converting an electrical signal into a mechanical stimulus or an electrical stimulus. For example, the haptic unit 834 may include a motor, a piezoelectric element, or an electrical stimulation device.

The sound output unit 836 may audibly provide information about the aerosol generating device 800 to the user. For example, the sound output unit 836 may convert an electrical signal into a sound signal and output the same to the outside.

The battery 840 may supply power used to operate the aerosol generating device 800. The battery 840 may supply power such that the heater 850 may be heated. In addition, the battery 840 may supply power required for operations of other components (e.g., the sensing unit 820, the output unit 830, the user input unit 860, the memory 870, and the communication unit 880) in the aerosol generating device 800. The battery 840 may be a rechargeable battery or a disposable battery. For example, the battery 840 may be a lithium polymer (LiPoly) battery, but is not limited thereto.

The heater 850 may receive power from the battery 840 to heat an aerosol generating material. Although not illustrated in FIG. 8, the aerosol generating device 800 may further include a power conversion circuit (e.g., a direct current (DC)/DC converter) that converts power of the battery 840 and supplies the same to the heater 850. In addition, when the aerosol generating device 800 generates aerosols in an induction heating method, the aerosol generating device 800 may further include a DC/alternating current (AC) that converts DC power of the battery 840 into AC power.

The controller 810, the sensing unit 820, the output unit 830, the user input unit 860, the memory 870, and the communication unit 880 may each receive power from the battery 840 to perform a function. Although not illustrated in FIG. 8, the aerosol generating device 800 may further include a power conversion circuit that converts power of the battery 840 to supply the power to respective components, for example, a low dropout (LDO) circuit, or a voltage regulator circuit.

In an embodiment, the heater 850 may be formed of any suitable electrically resistive material. For example, the suitable electrically resistive material may be a metal or a metal alloy including titanium, zirconium, tantalum, platinum, nickel, cobalt, chromium, hafnium, niobium, molybdenum, tungsten, tin, gallium, manganese, iron, copper, stainless steel, nichrome, or the like, but is not limited thereto. In addition, the heater 850 may be implemented by a metal wire, a metal plate on which an electrically conductive track is arranged, a ceramic heating element, or the like, but is not limited thereto.

In another embodiment, the heater 850 may be a heater of an induction heating type. For example, the heater 850 may include a suspector that beats an aerosol generating material by generating heat through a magnetic field applied by a coil.

The user input unit 860 may receive information input from the user or may output information to the user. For example, the user input unit 860 may include a key pad, a dome switch, a touch pad (a contact capacitive method, a pressure resistance film method, an infrared sensing method, a surface ultrasonic conduction method, an integral tension measurement method, a piezo effect method, or the like), a jog wheel, a jog switch, or the like, but is not limited thereto. In addition, although not illustrated in FIG. 8, the aerosol generating device 800 may further include a connection interface, such as a universal serial bus (USB) interface, and may connect to other external devices through the connection interface, such as the USB interface, to transmit and receive information, or to charge the battery 840.

The memory 870 is a hardware component that stores various types of data processed in the aerosol generating device 800, and may store data processed and data to be processed by the controller 810. The memory 870 may include at least one type of storage medium from among a flash memory type, a hard disk type, a multimedia card micro type memory, a card-type memory (for example, secure digital (SD) or extreme digital (XD) memory, etc.), random access memory (RAM), static random access memory (SRAM), read-only memory (ROM), electrically erasable programmable read-only memory (EEPROM), programmable read-only memory (PROM), a magnetic memory, a magnetic disk, and an optical disk. The memory 870 may store an operation time of the aerosol generating device 800, the maximum number of puffs, the current number of puffs, at least one temperature profile, data on a user's smoking pattern, etc.

The communication unit 880 may include at least one component for communication with another electronic device. For example, the communication unit 880 may include a short-range wireless communication unit 882 and a wireless communication unit 884.

The short-range wireless communication unit 882 may include a Bluetooth communication unit, a Bluetooth Low Energy (BLE) communication unit, a near field communication unit, a wireless LAN (WLAN) (Wi-Fi) communication unit, a Zigbee communication unit, an infrared data association (IrDA) communication unit, a Wi-Fi Direct (WFD) communication unit, an ultra wideband (UWB) communication unit, an Ant+ communication unit, or the like, but is not limited thereto.

The wireless communication unit 884 may include a cellular network communication unit, an Internet communication unit, a computer network (e.g., local area network (LAN) or wide area network (WAN)) communication unit, or the like, but is not limited thereto. The wireless communication unit 884 may also identify and authenticate the aerosol generating device 800 within a communication network by using subscriber information (e.g., International Mobile Subscriber Identifier (IMSI)).

The controller 810 may control general operations of the aerosol generating device 800. In an embodiment, the controller 810 may include at least one processor. The processor may be implemented as an array of a plurality of logic gates or may be implemented as a combination of a general-purpose microprocessor and a memory in which a program executable by the microprocessor is stored. It will be understood by one of ordinary skill in the art that the processor may be implemented in other forms of hardware.

The controller 810 may control the temperature of the heater 850 by controlling supply of power of the battery 840 to the heater 850. For example, the controller 810 may control power supply by controlling switching of a switching element between the battery 840 and the heater 850. In another example, a direct heating circuit may also control power supply to the heater 850 according to a control command of the controller 810.

In an embodiment, the controller 810 may set a preheating temperature profile for the heater 850 on the basis of a signal output from the sensing unit 820, and supply power to the heater 850 on the basis of the set preheating temperature profile. For example, according to a case in which a signal output from the sensing unit 820 falls within a preset range, a case in which the signal exceeds the preset range, or a case in which the signal is less than the preset range, the controller 810 may set the preheating temperature profile for the heater 850 to different preheating temperature profiles.

The controller 810 may analyze a result sensed by the sensing unit 820 and control subsequent processes to be performed. For example, the controller 810 may control power supplied to the heater 850 to start or end an operation of the heater 850 on the basis of a result sensed by the sensing unit 820. As another example, the controller 810 may control, based on a result sensed by the sensing unit 820, an amount of power supplied to the heater 850 and the time the power is supplied, such that the heater 850 may be heated to a certain temperature or maintained at an appropriate temperature.

The controller 810 may control the output unit 830 on the basis of a result sensed by the sensing unit 820. For example, when the number of puffs counted through the puff sensor 826 reaches a preset number, the controller 810 may notify the user that the aerosol generating device 800 will soon be terminated through at least one of the display unit 832, the haptic unit 834, and the sound output unit 836.

One embodiment may also be implemented in the form of a computer-readable recording medium including instructions executable by a computer, such as a program module executable by the computer. The computer-readable recording medium may be any available medium that may be accessed by a computer and includes both volatile and nonvolatile media, and removable and non-removable media. In addition, the computer-readable recording medium may include both a computer storage medium and a communication medium. The computer storage medium includes all of volatile and nonvolatile media, and removable and non-removable media implemented by any method or technology for storage of information such as computer-readable instructions, data structures, program modules, or other data. The communication medium typically includes computer-readable instructions, data structures, other data in modulated data signals such as program modules, or other transmission mechanisms, and includes any information transfer media.

The descriptions of the above-described embodiments are merely examples, and it will be understood by one of ordinary skill in the art that various changes and equivalents thereof may be made. Therefore, the scope of the disclosure should be defined by the appended claims, and all differences within the scope equivalent to those described in the claims will be construed as being included in the scope of protection defined by the claims.

The invention claimed is:

1. An aerosol generating device comprising:

a heater configured to heat an aerosol generating article;

a sensor configured to output a signal indicating a change in capacitance which occurs by insertion of the aerosol generating article; and a processor electrically connected to the heater and the sensor, and configured to:

detect whether the signal output from the sensor falls within a preset range, when the signal falls within the preset range, set a preheating temperature profile to a first temperature profile, wherein the first temperature profile comprises a temperature rise phase, a temperature maintenance phase and a temperature drop phase;

when the signal exceeds a maximum value of the preset range, set the preheating temperature profile to a second temperature profile, wherein the second temperature profile is obtained by changing a power supply time to the heater corresponding to the temperature rise phase or the temperature maintenance phase of the first temperature profile; and supply power to the heater according to the set preheating temperature profile.

2. The aerosol generating device of claim 1, wherein the second temperature profile comprises a lower preheating target temperature than the first temperature profile.

3. The aerosol generating device of claim 1, wherein the second temperature profile comprises a shorter temperature maintenance phase than the first temperature profile.

4. The aerosol generating device of claim 1, wherein the second temperature profile comprises a drying phase for evaporating at least a portion of moisture contained in the aerosol generating article.

5. The aerosol generating device of claim 4, wherein the drying phase comprises a phase that evaporates moisture at a temperature ranging from 100° C. to 250° C.

6. The aerosol generating device of claim 1, wherein the processor is further configured to:

when the signal is less than a minimum value of the preset range, set the preheating temperature profile to a third temperature profile that is distinct from the first temperature profile and the second temperature profile.

7. The aerosol generating device of claim 6, wherein the third temperature profile comprises a lower preheating target temperature than the first temperature profile, and a longer preheating time than the first temperature profile.

8. The aerosol generating device of claim 1, wherein the preheating temperature profile comprises the temperature rise phase in which a temperature of the heater rises to a preheating target temperature, the temperature maintenance phase in which the temperature of the heater is maintained at the preheating target temperature, and the temperature drop phase in which the temperature of the heater is lowered to a preheating end temperature.

9. The aerosol generating device of claim 1, wherein the change in capacitance corresponds to an amount of moisture contained in the aerosol generating article.

10. The aerosol generating device of claim 1, wherein the signal comprises at least one of a voltage change signal, a frequency change signal, and a charge/discharge time change signal.

11. The aerosol generating device of claim 1, wherein the preheating temperature profile comprises one of the first temperature profile or the second temperature profile, and wherein each of the first temperature profile and the second temperature profile comprises, in sequence, the temperature rise phase in which a temperature of the heater rises to a preheating target temperature, the temperature maintenance phase in which the temperature of the heater is maintained at the preheating target temperature, and the temperature drop phase in which the temperature of the heater is lowered to a preheating end temperature.

12. The aerosol generating device of claim 11, wherein a preheating target temperature of the second temperature profile is lower than a preheating target temperature of the first temperature profile, and wherein a rate of temperature increase in the temperature rise phase of the first temperature profile is same as a rate of temperature increase in the temperature rise phase of the second temperature profile.

13. The aerosol generating device of claim 12, wherein the temperature maintenance phase of the second temperature profile is shorter than the temperature maintenance phase of the first temperature profile.

14. The aerosol generating device of claim 1, wherein the preheating temperature profile comprises one of the first temperature profile, the second temperature profile, and a third temperature profile, wherein each of the first temperature profile, the second temperature profile, and the third temperature profile comprises, in sequence, the temperature rise phase in which a temperature of the heater rises to a preheating target temperature, the temperature maintenance phase in which the temperature of the heater is maintained at the preheating target temperature, and the temperature drop phase in which the temperature of the heater is lowered to a preheating end temperature, wherein the processor is further configured to:

when the signal is less than a minimum value of the preset range, set the preheating temperature profile to the third temperature profile that is distinct from the first temperature profile and the second temperature profile, and wherein the preheating target temperature of the second temperature profile and the preheating target temperature of the third temperature profile are lower than the preheating target temperature of the first temperature profile.

15. The aerosol generating device of claim 14, wherein the processor is further configured to, after supplying power to the heater according to the set preheating temperature profile, supply power to the heater according to a heating temperature profile.

* * * * *